United States Patent
Horne et al.

(10) Patent No.: US 10,635,817 B2
(45) Date of Patent: Apr. 28, 2020

(54) TARGETED SECURITY ALERTS

(71) Applicant: HEWLETT-PACKARD DEVELOPMENT COMPANY, L.P., Houston, TX (US)

(72) Inventors: William G Horne, Princeton, NJ (US); Tomas Sander, Princeton, NJ (US); Krishnamurthy Viswanathan, Palo Alto, CA (US); Anurag Singla, Sunnyvale, CA (US); Siva Raj Rajagopalan, Chandler, AZ (US)

(73) Assignee: Micro Focus LLC, Santa Clara, CA (US)

( * ) Notice: Subject to any disclaimer, the term of this patent is extended or adjusted under 35 U.S.C. 154(b) by 708 days.

(21) Appl. No.: 14/764,670

(22) PCT Filed: Jan. 31, 2013

(86) PCT No.: PCT/US2013/024029
§ 371 (c)(1),
(2) Date: Jul. 30, 2015

(87) PCT Pub. No.: WO2014/120181
PCT Pub. Date: Aug. 7, 2014

(65) Prior Publication Data
US 2015/0371044 A1 Dec. 24, 2015

(51) Int. Cl.
*G06F 21/57* (2013.01)
*H04L 29/06* (2006.01)

(52) U.S. Cl.
CPC ......... *G06F 21/57* (2013.01); *G06F 21/577* (2013.01); *H04L 63/1408* (2013.01); *H04L 63/20* (2013.01); *G06F 2221/034* (2013.01)

(58) Field of Classification Search
CPC .. G06F 21/57; G06F 21/577; G06F 2221/034; H04L 63/1408; H04L 63/20
USPC ....................................................... 726/1, 25
See application file for complete search history.

(56) References Cited

U.S. PATENT DOCUMENTS

| 6,807,569 B1 | 10/2004 | Bhimani et al. |
| 7,461,036 B2 | 12/2008 | Genty et al. |
| 7,500,266 B1 * | 3/2009 | Vukelich ............. H04L 63/1416 726/23 |

(Continued)

FOREIGN PATENT DOCUMENTS

| CN | 101385034 | 3/2009 |
| WO | WO-2004/031953 A1 | 4/2004 |
| WO | WO-2012/166194 A1 | 12/2012 |

OTHER PUBLICATIONS

Extended European Search Report, EP Application No. 13873289.6, dated Aug. 24, 2016, pp. 1-8, EPO.

(Continued)

*Primary Examiner* — Abu S Sholeman (57) ABSTRACT

Providing a targeted security alert can include collecting participant data from a plurality of participants within a threat exchange community, calculating, using a threat exchange server, a threat relevancy score of a participant among the plurality of participants within the threat exchange community using the collected participant data, and providing, from the threat exchange server to the participant, the targeted security alert based on the calculated threat relevancy score via a communication link within the threat exchange community.

14 Claims, 4 Drawing Sheets

(56) References Cited

U.S. PATENT DOCUMENTS

| | | | |
|---|---|---|---|
| 7,594,224 B2 | 9/2009 | Patrick et al. | |
| 7,779,119 B2 | 8/2010 | Ginter et al. | |
| 7,784,097 B1 | 8/2010 | Stolfo et al. | |
| 7,841,008 B1 | 11/2010 | Cole et al. | |
| 7,953,846 B1 | 5/2011 | Amoroso et al. | |
| 7,996,888 B2 | 8/2011 | Asunmaa et al. | |
| 8,065,725 B2 | 11/2011 | Zheng et al. | |
| 8,201,257 B1* | 6/2012 | Andres | G06F 21/56 726/23 |
| 8,204,813 B2 | 6/2012 | Merkoulovitch et al. | |
| 8,286,239 B1 | 10/2012 | Sutton | |
| 8,327,442 B2 | 12/2012 | Herz et al. | |
| 9,940,479 B2* | 4/2018 | Ionescu | G06F 16/285 |
| 2005/0102534 A1 | 5/2005 | Wong | |
| 2006/0218640 A1* | 9/2006 | Lotem | H04L 63/1433 726/25 |
| 2007/0067846 A1* | 3/2007 | McFarlane | G06F 21/577 726/25 |
| 2007/0169171 A1 | 7/2007 | Kumar et al. | |
| 2007/0169194 A1* | 7/2007 | Church | G06F 21/552 726/23 |
| 2008/0172382 A1 | 7/2008 | Prettejohn | |
| 2008/0229422 A1* | 9/2008 | Hudis | G06F 21/552 726/25 |
| 2010/0090827 A1* | 4/2010 | Gehrke | G08B 21/0269 340/539.13 |
| 2010/0169474 A1* | 7/2010 | Beckett, III | H04L 12/00 709/224 |
| 2010/0299292 A1 | 11/2010 | Collazo | |
| 2011/0047167 A1* | 2/2011 | Caceres | G06Q 10/10 707/749 |
| 2011/0153383 A1 | 6/2011 | Bhattacharjya et al. | |
| 2011/0161069 A1 | 6/2011 | Staffel | |
| 2011/0173699 A1 | 7/2011 | Figlin et al. | |
| 2011/0239270 A1 | 9/2011 | Sovio et al. | |
| 2011/0302653 A1 | 12/2011 | Lloyd et al. | |
| 2012/0072983 A1 | 3/2012 | McCusker et al. | |
| 2012/0233698 A1 | 9/2012 | Watters et al. | |
| 2012/0246730 A1 | 9/2012 | Raad et al. | |
| 2013/0174259 A1* | 7/2013 | Pearcy | H04L 41/0893 726/25 |
| 2014/0075004 A1* | 3/2014 | Van Dusen | H04L 41/04 709/223 |
| 2015/0215329 A1* | 7/2015 | Singla | H04L 63/1416 726/23 |

OTHER PUBLICATIONS

Abdulrahman, "Investigating the Technological and Practical Levels of Maturity of the Industry to Implement Web Services Security", Masters Thesis for: Department of Numerical Analysis and Computer Science, Stockholm Royal Institute of Technology, Oct. 2005, 92 pages.

Ando, et al., "Parallel analysis for lightweight network incident detection using nonlinear adaptive systems", Proceedings of IFIP International Conference on Network and Parallel Computing, Sep. 18-21, 2007, 7 pages.

Ben-Shalom, et al., "Granular Trust Model Improves Enterprise Security", www.intel.com/IT, Intel Corporation, Nov. 2012, 8 pages.

Boggs, et al., "Cross-domain Collaborative Anomaly Detection: So Far Yet So Close", 12th International Symposium on Recent Advances in Intrusion Detection, RAID 2009, Saint-Malo, Brittany, France, Sep. 23-25, 2009, 20 pages.

Evans, et al., "Context-derived Pseudonyms for Protection of Privacy in Transport Middleware and Applications", Proceedings of the Fifth IEEE International Conference on Pervasive Computing and Communications Workshops (PERCOMW'07), Mar. 2007, 6 pages.

Fiat, et al., "Broadcast Encryption", Advances in Cryptology (CRYPTO'93), Lecture Notes in Computer Science, vol. 773, Jul. 1994, 13 pages.

Fokoue, et al., "A Decision Support System for Secure Information Sharing," The 14th ACM Symposium on Access Control Models and Technologies SACMAT'09, Jun. 3-5, 2009, Stresa, Italy, 10 pages.

International Search Report & Written Opinion, Oct. 25, 2013, PCT Patent Application No. PCT/US2013/024029, 9 pages.

Jain, et al., "Data Clustering: A Review", ACM Computing Surveys, vol. 31, No. 3, Sep. 1999, pp. 264-323.

Julisch, K., "Mining Alarm Clusters to Improve Alarm Handling Efficiency", Proceedings of the 17th Annual Computer Security Applications Conference (ACSAC01), Dec. 10-14, 2001, 10 pages.

Kaplan, Dan., "Sharing the pie: Threat Collaboration", Accessed via: http://www.scmagazine.com/sharing-the-pie-threat-collaboration/article/250421/, SC Magazine, Aug. 1, 2012, 3 pages.

Katti, et al., "Collaborating Against Common Enemies", ACM Internet Measurement Conference, Aug. 2005, 23 pages.

Lee, W., "A Data Mining Framework for Constructing Features and Models for Intrusion Detection Systems", PhD Thesis, Columbia University, 1999, 193 pages.

Neubauer., "An Evaluation of Technologies for the Pseudonymization of Medical Data", In Computer and Information Science, SCI 208, Apr. 2009, pp. 47-60.

Phillips, et al., "Information Sharing and Security in Dynamic Coalitions," Jun. 2002, 16 pages.

Porras, et al., "A Mission-Impact-Based Approach to INFOSEC Alarm Correlation", Proc. Int'l Symp. The Recent Advances in Intrusion Detection, Oct. 2002, 19 pages.

Punj, et al., "Cluster Analysis in Marketing Research: Review and Suggestions for Application", Journal of Marketing Research, vol. 20, No. 2, May 1983, pp. 134-148.

Sundaramurthy, et al., "Examining Intrusion Prevention System Events from Worldwide Networks", 19th ACM Pre-Conference on Building Analysis Datasets and Gathering Experience Returns for Security (BADGERS'12), Raleigh, NC, USA, Oct. 15, 2012, 8 pages.

Sweeney, Latanya., "Uniqueness of simple demographics in the U.S. population", (Shorter Version: "Simple Demographics Often Identify People Uniquely") LIDAPWP4, Carnegie Mellon University, Laboratory for International Data Privacy, Pittsburgh, PA, May 2000, 34 pages.

Unknown., "AlienVault Open Threat Exchange" Dec. 2012, 2 pages.

Unknown., "Monitoring, Analysis, and Correlation" Accessed via: http http://www.cisco.com/en/US/docs/solutions/Enterprise/Security/SAFE_RG/chap10.html, Dec. 2012, 26 pages.

Unknown., "Real-Time Threat Management—Securing Your Journey to the Cloud", Trend Micro, Jun. 2011, 2 pages.

Vaarandi, Risto., "A data clustering algorithm for mining patterns from event logs", 3rd IEEE Workshop on IP Operations and Management, 2003, (IPOM 2003), Oct. 1-3, 2003, 8 pages.

Wedel, et al., "Market Segmentation: Conceptual and Methodological Foundations", Journal of Targeting Measurement and Analysis for Marketing, Aug. 2000, Kluwer Academic Publishers, vol. 9, Issue: 1, 2 pages.

Zhang, et al., "Highly Predictive Blacklisting", 17th USENIX Security Symposium, San Jose, CA, USA, Jul. 28-Aug. 1, 2008, pp. 107-122.

Zhou, et al., "Modeling Network Intrusion Detection Alerts for Correlation", ACM Transactions on Information and System Security, vol. 10, No. 1, Article 4, Feb. 2007, 31 pages.

\* cited by examiner

TARGETED SECURITY ALERTS

CROSS-REFERENCE TO RELATED APPLICATION

This application is a national stage application under 35 U.S.C. § 371 of PCT/US2013/024029, filed Jan. 31, 2013.

BACKGROUND

Entities can maintain internal networks with one or more connections to the Internet. Internal networks include a plurality of resources connected by communication links, and can be used to connect people, provide services—both internally and externally via the Internet—and/or organize information, among other activities associated with an entity. Resources on the network can be susceptible to security attacks that originate either within the internal network or on the Internet. A security attack can include an attempt to destroy, modify, disable, steal, and/or gain unauthorized access to use of an asset (e.g., a resource, data, and information). Multiple entities can be both susceptible to and subject to common security attacks.

DETAILED DESCRIPTION

Entities can seek to avoid security attacks by identifying vulnerabilities in their networks. A vulnerability can include a flaw and/or weakness in the network's design, implementation, operation, and/or management that could be exploited to violate the network's security policy (e.g., a circumstance and/or event with the potential to adversely impact a network through unauthorized access, destruction, disclosure, and/or modification of an asset of the entity). An exploit can include computer-readable instructions, data, and/or a sequence of commands that takes advantage of a vulnerability to cause unwanted and/or unanticipated behavior. A security attack can include a use and/or attempted use of an exploit against a vulnerability. To avoid subsequent security attacks, an entity can perform an investigation (e.g., forensic investigation) to determine what exploits were used against what vulnerabilities during the security attack.

It can be beneficial for an entity to identify current security threats to a network associated with the entity, to information held by the entity, and/or to resources managed by the entity (e.g., computing devices, memory resources, processing resources). A security threat can include information that indicates the possibility of an impending security attack. The information can include information indicating a vulnerability and/or exploit, and/or information that an attack has occurred to another entity, among other information.

Entities face increasingly sophisticated, professional, organized, and well-funded security attacks on their information technology (IT) infrastructures. By quickly and accurately detecting, identifying, and/or addressing security threats, an entity may mitigate the effects of these security attacks. However, entities may find it increasingly difficult to quickly and accurately detect, identify, and/or address these security threats on their own. Entities may currently identify security threats by accessing a plurality of threat intelligence sources. The threat intelligence sources can, however, provide a vast amount of information and can result in a flood of security threats. The security threats can lead to false positive security alerts that may take human resources to analyze and resolve. Encouraging entities to share information relating to security threats may improve the speed and/or accuracy in detecting emerging threats.

In accordance with examples of the present disclosure, an entity can participate in a threat exchange community to identify security threats. For instance, a threat exchange community can include a group of computing systems that exchange information (e.g., data) related to information technology (IT) infrastructures (e.g., systems and services) via communication links. The computing systems can be referred to as participants of the threat exchange community. In some implementations, entities including and/or controlling the computing systems can also be referred to as participants of the threat exchange community.

For example, participants include a participant server or group of participant servers within the IT infrastructure of each entity from a group of entities. Each participant server (or each group of participant servers) can provide information related to actions within or at the IT infrastructure including that participant server to a threat exchange server. The threat exchange server can analyze information provided by each participant server to identify security occurrences within the threat exchange community, and provide targeted security alerts related to the security occurrences to participant servers. A security occurrence, as used herein, can include variables and information (e.g., data) that influence an action by the threat exchange server. For example, such security occurrences that influence an action can include information describing a security context, a security attack, a security threat, a suspicious event, a vulnerability, an exploit, an alert, an incident, and/or other relevant events, identified using the participant provided information.

In some examples, participant servers communicate in a peer-to-peer architecture and the threat exchange server, or functionalities thereof, is distributed across the participant servers or a subset of the participant servers. That is, in some examples a threat exchange community does not include a centralized threat exchange server. Rather, the threat exchange server is realized at a group of participant servers.

As used herein, a targeted security alert can include a notification that a participant is at risk of being under attack (e.g., a security attack). Such a notification, in some instances, can be by a particular attacker using a particular exploit against a particular vulnerability. Because a targeted security alert depends on security data provided by the participant, the participant can receive a targeted security alert based on an amount and/or detail of security data provided. Thereby, the security threat exchange community, in accordance with examples of the present disclosure, can prevent participants from receiving alerts without providing data and/or with providing limited data, often called "free-riders."

Further, in various examples of the present disclosure, participants can be grouped into a plurality of clusters. The plurality of clusters can be dynamically formed based on participant provided characteristic data (e.g., infrastructure, size, industry), security data (e.g., host names, Internet protocol (IP) addresses, patch levels), and/or common security occurrence patterns identified (e.g., common security attacks, events, and incidents identified between participants). The clusters can be used to calculate threat relevancy scores for participants within the threat exchange community (as discussed further herein).

Systems, methods, and computer-readable and executable instructions are provided for providing targeted security alerts. Providing a targeted security alert can include collecting participant data from a plurality of participants within a threat exchange community, calculating, using a threat exchange server, a threat relevancy score of a participant among the plurality of participants using the collected participant data, and providing, from the threat exchange server to the participant, a targeted security alert based on the calculated threat relevancy score via a communication link within the threat exchange community.

In the following detailed description of the present disclosure, reference is made to the accompanying drawings that form a part hereof, and in which is shown by way of illustration how examples of the disclosure can be practiced. These examples are described in sufficient detail to enable those of ordinary skill in the art to practice the examples of this disclosure, and it is to be understood that other examples can be utilized and that process, electrical, and/or structural changes can be made without departing from the scope of the present disclosure.

The figures herein follow a numbering convention in which the first digit or digits correspond to the drawing figure number and the remaining digits identify an element or component in the drawing. Similar elements or components between different figures may be identified by the use of similar digits. For example, 102 may reference element "02" in FIG. 1, and a similar element may be referenced as 302 in FIG. 3. As will be appreciated, elements shown in the various examples herein can be added, exchanged, and/or eliminated so as to provide a number of additional examples of the present disclosure In addition, as will be appreciated, the proportion and the relative scale of the elements provided in the figures are intended to illustrate the examples of the present disclosure, and should not be taken in a limiting sense. As used herein, the designators "N", "K, and "L" particularly with respect to reference numerals in the drawings, indicates that a number of the particular feature so designated can be included with a number of examples of the present disclosure. Also, as used herein, "a number of" an element and/or feature can refer to one or more of such elements and/or features.

Figure 1:
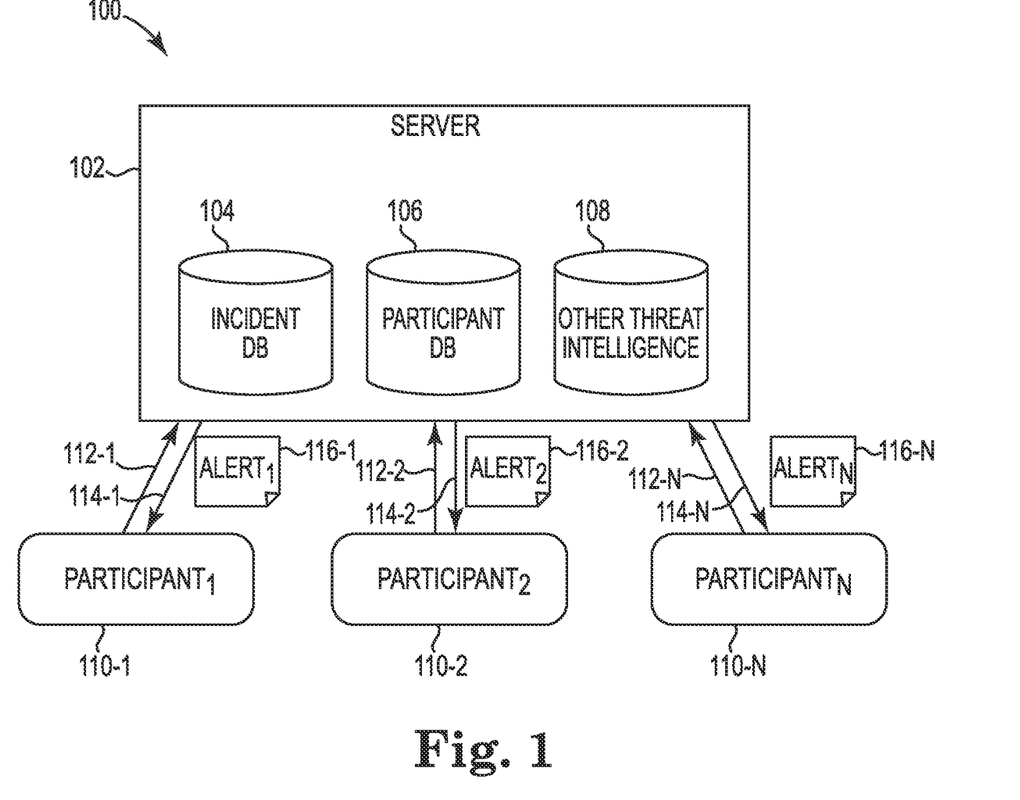
FIG. 1 illustrates a flow chart of an example of an environment for providing a targeted security alert according to the present disclosure.

FIG. 1 illustrates a flow chart of an example of an environment 100 for providing a targeted security alert according to the present disclosure. The environment 100 can include a threat exchange community. A threat exchange community can include a plurality of participants 110-1, 110-2, . . . , 110-N connected to a threat exchange server 102.

The arrows (e.g., 112-1, 112-2, 112-N, 114-1, 114-2, 114-N) as illustrated in the example of FIG. 1 illustrate communication between the threat exchange server 102 and the plurality of participants 110-1, . . . , 110-N. The communication illustrated by the arrows can include communications links within the threat exchange community. Communication links, as used herein, can include network connections, such as logical and/or physical connections. The communication links providing communication from the participants 110-1, . . . , 110-N to the threat exchange server 102 (e.g., as illustrated by 112-1, 112-2, . . . , 112-N) may be the same and/or different from the communication links providing communication from the threat exchange server 102 to the participants 110-1, . . . , 110-N (e.g., as illustrated by 114-1, 114-2, . . . , 114-N), for example.

The plurality of participants 110-1, . . . , 110-N can provide participant data to the threat exchange server 102 (e.g., as illustrated by the arrows 112-1, . . . , 112-N from the participants 110-1, . . . , 110-N to the threat exchange server 102). The participant data can include security data and/or characteristic data. Security data, as used herein, can include security related information (e.g., IP addresses, host names, patch levels, personally identifiable information, participant specific security information, etc.) For instance, security data can include information that describes security occurrences. A security occurrence, as used herein, can include variables and information (e.g., data) that influence an action by the threat exchange server. For example, such security occurrences that influence an action can include information describing a security context, a security attack, a security threat, a suspicious event, a vulnerability, an exploit, an alert, an incident, and/or other relevant events, identified using the participant provided information (e.g., the participant data).

Characteristic data can include data related to the participant, such as infrastructure data, industry sector identification, and/or size of the entity, for example. In a number of examples, characteristic data can include historical security data identifying previous security occurrences identified by a participant.

An event (or security event), as used herein, can include a description of something that has happened. An event may be used to describe both the thing that happened and the description of the thing that happened. For instance, an event can include information such as records within a log associated with the event. Examples of events include, "Alice logged into the machine at IP address 10.1.1.1", "The machine at IP address 192.168.10.1 transferred 4.2 gigabytes of data to the machine at IP address 8.1.34.2.", "A mail message was sent from fred@flinstones.com to betty@rubble.com at 2:38 pm", or "John Smith used his badge to open door 5 in building 3 at 8:30 pm". Events can contain a plurality of detailed data and may be formatted in a way that is computer readable (e.g. comma separated fields). In some examples, events do not correspond to anything obviously related to security. For instance, events can be benign.

An incident (or security incident) can be information that indicates the possibility that a security attack has occurred and/or is currently occurring. Unlike a security threat, which is about the future, an incident is about the past and present. An incident can include evidence of fault play, an alert triggered by a system that detects exploit activity, and/or suspicious or anomalous activity. Incidents can be investigated to determine if a security attack actually did happen (in many cases an incident can be a false positive) and what were the root causes (i.e. what vulnerabilities and exploits were used).

An alert (or security alert), as used herein, can include an event that indicates the possibility of an attack. For instance, an intrusion detection system of a participant (e.g., 110-1, . . . , 110-N) and/or the threat exchange server 102 can look for behaviors that are known to be suspicious and generate an event to that effect. Such an event (e.g., an alert) can have a priority associated with it to indicate how likely it is to be a security attack and/or how dangerous the observed behavior was.

Security context can include information that describes something about the participant (e.g., participant characteristic data), the overall threat level of a security occurrence, something about an individual or local threat environment, information about the global threat environment of the threat exchange community (e.g., increased activity of a particular type), and/or other useful information. Said differently, a security context describes and/or is the security-related conditions within the threat exchange community. As examples, a security context can describe or account for a security threat level within the threat exchange community, a qualitative assessment of the security attacks and/or security threats within the threat exchange community, activity and/or events within the threat exchange community, the IT infrastructure within the threat exchange community, incidents within the threat exchange community, information provided by a threat exchange server, information collected by a participant of the threat exchange community, and/or other security-related information. As a specific example, a security context can be defined by security occurrences within a threat exchange community. That is, the security context of a participant or the threat exchange community can be determined based on security occurrences identified within the threat exchange community.

In some examples, the characteristic data can be collected from the plurality of participants 110-1, . . . , 110-N as part of a registration process. For instance, the participants 110-1, . . . , 110-N can register with the threat exchange server 1-2 and provide the characteristic data. The characteristic data can be updated over time, however, may not change often.

The threat exchange server 102, and functions thereof, in various examples of the present disclosure, can be part of and/or provided to the participants 110-1, . . . , 110-N as a service (e.g., a threat exchange service). A service, as used herein, can include an intangible commodity offered to users. For instance, services offered can include computing resources (e.g., storage, memory, processing resources) and/or computer-readable instructions (e.g., programs).

A threat exchange server 102, as used herein, can include computer hardware components (e.g., a physical server, processing resource, memory resource) and/or computer-readable instruction components designed and/or designated to provide a number of threat exchange functions. The threat exchange server 102, as illustrated in the example of FIG. 1, can include and/or access an incident database 104, a participant database 106, and/or other threat intelligence database 108. The environment 100 as illustrated in the example of FIG. 1 illustrates a single threat exchange server 102. However, examples in accordance with the present disclosure are not so limited. A threat exchange server, in various examples, can include a plurality of threat exchange servers.

A database, as used herein, can include a structured collection of data. The incident database 104 can be a database containing current and historical security occurrences of the threat exchange community (e.g., as reported by the participants 1101, . . . , 110-N). Current security occurrences can include security occurrences that are unresolved (e.g., security attacks and security incidents). Historical security occurrences can include security occurrences that have been resolved and/or are no longer considered a current security occurrence.

The participant database 106 can be a database containing participant provided characteristic data. As used herein, characteristic data can include IT system information, industry sector information, and/or infrastructure information (e.g., hardware and/or program instructions information), among other data related to each of the participants 110-1, . . . , 110-N. For example, characteristic data can include information about software running within the participant's infrastructure, such as application names, application versions, and/or operating system patch levels.

The threat exchange server 102, in various examples, can include an other threat intelligence database 108. The other threat intelligence database 108 can be a database containing external and internal threat intelligence. For instance, the threat intelligence can include identification and/or symptoms of security attacks.

The threat exchange server 102 can compare incoming security data from the plurality of participants 110-1, . . . , 110-N to the incident database 104, the participant database 106, and/or the other threat intelligence database 108 to provide targeted security alerts 116-1, 116-2, . . . , 116-N to the participants 110-1, . . . , 110-N. The security data can include real-time and/or near real-time security events, context, and/or incidents.

The participant provided data, in some examples of the present disclosure, can be provided by the participants 110-1, . . . , 110-N as free-form text incident descriptions. A semantic text processing tool, such as Intelligent Data Operating Layer (IDOL) server, can be applied to determine the similarity of different free-form incident descriptions. This can assist in determining which participants 110-1, . . . , 110-N are submitting similar incident and/or event data.

For instance, the threat exchange server 102 can calculate a threat relevancy score of a participant (e.g., particular participant 110-2) among the plurality of participants 110-1, . . . , 110-N using the collected participant data. A threat relevancy score, as used herein, can include a score identifying a relevancy of the security occurrence to the particular participant (e.g., how likely the participant is to experience the security occurrence, the impact such a score might have on the participant, or the ranking of a security occurrence in terms of relevancy with respect to other security occurrences that might affect the participant, and/or a combination thereof). The threat relevancy score can be related to a particular security occurrence. In some examples, a threat relevancy score can include a probability. For instance, a threat relevancy score can include a statistical probability that a security occurrence (e.g., a security attack) is relevant to the participant 110-2. In various instances, the security occurrences can be associated with a participant in the threat exchange community (e.g., first participant 110-1). A security occurrence can be associated with a participant if the participant has a verified security attack and/or is experiencing suspicious behaviors and/or events, for example.

For instance, the collected participant data used to calculate the threat relevancy score can include a subset of the total collected participant data. The subset can include participant data collected from the participant (e.g., particular participant 110-2) and participants within a cluster. The participants 110-1, . . . , 110-N can be grouped, for instance, into a plurality of clusters based on the participant provided data. The grouping of clusters can be based on similar behaviors identified from the participant provided data.

The threat relevancy score can be calculated, for instance, by comparing the participant 110-2 to a cluster of participants. As an example, the cluster may have a verified security attack. If the participant 110-2 belongs (e.g., is grouped in) to the cluster with the verified security attack, a targeted security alert can be provided to the participant 110-2. If the participant 110-2 does not belong to the cluster with the verified security attack, characteristic data and/or security data of the participant 110-2 can be compared to characteristic data and/or security data of the cluster to determine a similarity of the participant to the cluster and to calculate a threat relevancy score (as discussed further herein).

Calculating the threat relevancy score for each participant 110-1, ..., 110-N can include a variety of techniques to measure the similarity of participants 110-1, ..., 110-N. As an example, the threat exchange server 102 can compare incoming security data from the remaining participants to a cluster of participants with a verified security attack. Similarities can include similar events from an intrusion detection system (IDS), database access anomalies, and/or correlated IP addresses, for example.

In some examples, calculating the threat relevancy scores for participants 110-1, ..., 110-N can include statistically modeling a security occurrence at each participant 110-1, ..., 110-N and calculating the conditional probability of encountering a specific event (e.g., probability that a particular participant will be attacked by an exploit against a vulnerability). The incoming security data provided to the threat exchange server 102 can be compared with participant provided characteristic data (e.g., data in the participant database 106) and/or with other threat intelligence data (e.g., data in the other threat intelligence database 108).

Although the present example illustrates calculating a probability, calculating a threat relevancy score in accordance with examples of the present disclosures is not so limited. A threat relevancy score can be calculated in situations when such a probability is not known. For instance, calculating a threat relevancy score, in various examples, can include identifying (e.g., determining) a relevancy of a security occurrence to a participant based on participant data. The relevancy, in various examples, can include a general likelihood that the participant will experience a security occurrence, its impact on the participant, or its ranking with respect to other security occurrences, and/or a combination thereof. Such a calculation may not include a numerical probability score, in some instances. For example, it may be known that security attack A is more likely to occur to participant 1 (e.g., 110-1) than security attack B. Using this general knowledge, a targeted security alert can be provided to participant 1 for security attack A that has a higher score than a targeted security alert provided to participant 1 for security attack B.

In various examples, calculating the threat relevancy score can include considering security context to identify a threat level (e.g., a severity of the security occurrence). For instance, security context can include information that describes something about the participant, the overall threat level of a security occurrence, information about the global threat environment of the threat exchange community (e.g., increased activity of a particular type), and/or other useful information. Comparing the characteristic data with incoming security data and/or security context can be used to determine how critical a security occurrence is to each participant (e,g., 110-1, ..., 110-N). For instance, depending on hardware and/or computer-readable instruction components utilized by the participant, a security occurrence may be of greater concern to a second participant 110-2 than a third participant 110-N.

As an example, assume a first participant 110-1 has a verified security attack. A severity of the security attack associated with the first participant 110-1 can be identified and used to calculate a threat relevancy score for the remaining participants 110-2 ... 110-N. A severity of the security occurrence associated with the first participant 110-1, in various examples, can be identified and/or determined based on security context provided by a cluster of participants. The cluster of participants can include the first participant 110-1 (e.g., a cluster of participants that the first participant 110-1 belongs to).

As another example, assume a cluster of participants has an identified security attack A and security context provided by the cluster identifies that security attack A caused damage of 1,000 dollars. Assume the cluster of participants also has an identified security attack B and security context provided by the cluster identifies that security attack B caused damage of 1 million dollars. A threat relevancy score of a participant (e.g., particular participant 110-1) with a calculated probability of security attack A occurring of 50% and security attack B occurring of 10% may include a higher threat relevancy score for security attack B than security attack A based on the security context (e.g., 1,000 dollars in damage caused by security attack A and 1 million dollars in damage caused by security attack B). That is, security context can affect the threat relevancy score.

In some examples, a targeted security alert can be calculated based on an identified security occurrence associated with a particular participant within the threat exchange community. For instance, based on security data provided from a first participant 110-1, a security occurrence (e.g., a security attack, a security incident, and suspicious event) associated with the first participant 110-1 can be identified. A security occurrence associated with a participant can include a security occurrence that affects the participant and/or is experienced by the participant. Identifying the security occurrence can include identifying a trait of the security occurrence. A trait of a security occurrence, as used herein, can include an identified symptom of the security attack, an identified vulnerability and/or exploit associated with a security incident, and/or a security event, among other information. For example, a symptom of a security attack can include a pattern of a plurality of actions and/or events associated with the security attack.

The identified trait can be used to calculate a threat relevancy score of the security occurrence to each of the remaining participants. For example, a threat relevancy score of a second participant 110-2 can be calculated using security data provided by the second participant 110-2 and/or a plurality of additional participants in the threat exchange community. For instance, the threat relevancy score can include a score, probability, and/or ranking which is calculated for each participant based on a similarity between the trait (e.g., the symptom, vulnerability, exploit, and event) that triggered identification of the security occurrence and security data provided by each participant 110-1, ..., 110-N.

Using the calculated threat relevancy score, a targeted security alert 116-1, ..., 116-N can be provided to each of the participants 110-1, ..., 110-N. For instance, a targeted security alert 116-1, ..., 116-N can be provided, in some examples, in response to the calculated threat relevancy score being greater than (e.g., beyond) a threshold score. A targeted security alert, as used herein, can include an alert (e.g., an event that indicates the possibility of an attack) that is generated based on behavior and/or information (e.g., security data and/or characteristic data provided) of a particular participant. The threshold score can include a predetermined numerical value. For instance, the threshold score can be participant configurable.

In some examples, the threat relevancy score can include a numerical score (e.g., 0 to 1) and/or a generic level. A generic level can include predetermined classifications such as "high", "medium", and "low", and/or "red", "yellow, "green", among other classifications. The classifications can include predetermined classifications set by the threat exchange community and/or by a participant 110-1, . . . , 110-N based on threat relevancy scores.

In various examples of the present disclosure, the targeted security alert 116-1, . . . , 116-N can be participant configurable. For instance, a participant can predetermine how the calculated threat relevancy score is used to provide a targeted security alert 116-1, . . . , 116-N. The configurations can include predetermined threshold scores, predetermined classifications, and/or indications on how to provide targeted security alerts.

As an example, a first participant 110-1 can configure a threshold score to 90%, thereby in response to a calculated threat relevancy score above 90% a targeted security alert 116-1 may be provided to the first participant 110-1. Although the present example illustrates a participant configuring the threshold, examples in accordance with the present disclosure are not so limited. In various examples, an operator of the threat exchange server 102 can configure the thresholds and/or settings of the targeted security alerts 116-1, . . . , 116-N.

Providing targeted security alerts to participants 110-1, . . . , 110-N in the threat exchange community can assist participants 110-1, . . . , 110-N in allocating human resources to security threats. A participant 110-1, . . . , 110-N can identify the most relevant security occurrences based on targeted security alerts provided and devote human resources accordingly. Further, because the targeted security alerts provided to participants are based on security data provided by the participant, the targeted security alerts can assist in preventing free-riders (e.g., participants who provide no and/or limited security data) in the environment 100 by encouraging participants to provide security data.

Figure 2:
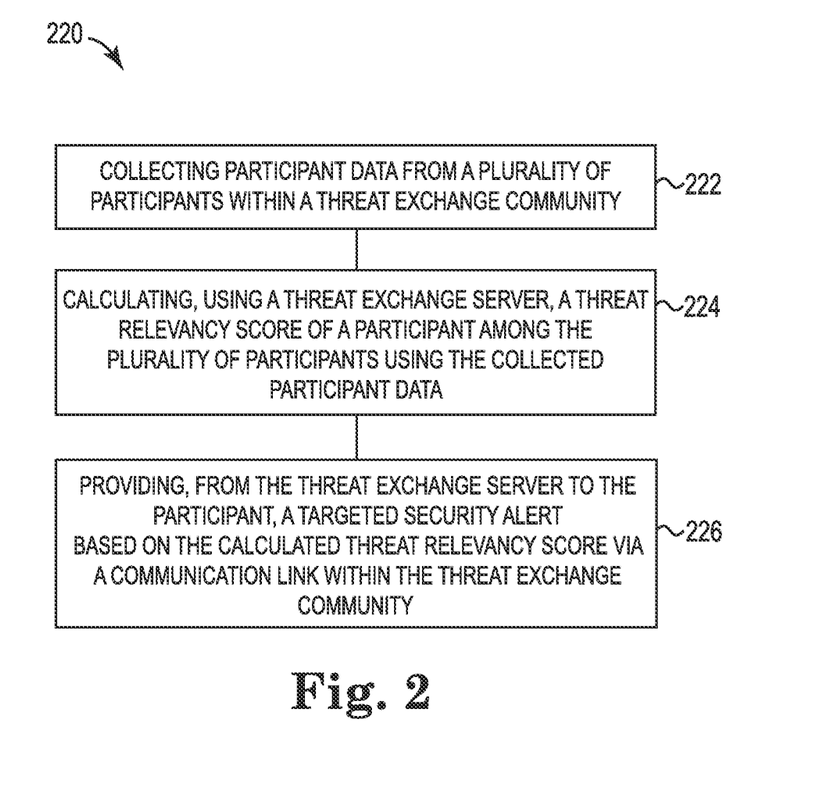
FIG. 2 illustrates a block diagram of an example of a method for providing a targeted security alert according to the present disclosure.

FIG. 2 illustrates a block diagram of an example of a method 220 for providing a targeted security alert according to the present disclosure. The method 220 can be used to provide security alerts to each of a plurality of participants within a threat exchange community that are related to relevant security occurrences.

At 222, the method 220 can include collecting participant data from a plurality of participants within a threat exchange community. The participant data can include characteristic data and security data. For instance, the plurality of participants can provide characteristic data to a threat exchange server as part of a registration process. The security data, in various examples, can be continuously collected from the plurality of participants. The participant data can be collected from the plurality of participants to a threat exchange server via communication links within the threat exchange community.

At 224, the method 220 can include calculating, using a threat exchange server, a threat relevancy score of a participant among the plurality of participants using the collected participant data. Calculating a threat relevancy score, in various examples, can include determining a relevancy of a security occurrence to a participant based on participant data (e.g., how likely the participant is to experience the security occurrence, the impact such a score might have on the participant, or the ranking of a security occurrence in terms of relevancy with respect to other security occurrences that might affect the participant, and/or a combination thereof).

In various examples of the present disclosure, calculating a threat relevancy score can include statistically modeling a probability that a security occurrence is relevant to the participant based on a subset of the participant data. The subset of the participant provided data, as used herein, can include participant data provided by the participant and participant data provided by a cluster of participants. As an example, statistically modeling a probability that a security occurrence is relevant to the participant can include modeling a probability that the participant will be attacked by an exploit against a vulnerability.

At 226, the method 220 can include providing, from the threat exchange server to the participant, a targeted security alert based on the calculated threat relevancy score via a communication link within the threat exchange community. A targeted security alert, as used herein, can include an event that indicates the possibility of a security attack. In some examples, the targeted security alert can include supporting evidence. Supporting evidence can include information associated with the security occurrence and/or the calculated threat relevancy score. Examples of supporting evidence can include identification of an exploit, identification of a vulnerability, and/or identification of the security occurrence, among other information.

Providing a targeted security alert can include sending the targeted security alert to the participant and/or storing the targeted security alert. The targeted security alerts can be stored at a known and/or predetermined location, such as a uniform resource locator (URL), where the participant can access the targeted security alert. In such instances, providing the targeted security alert can include sending a message (e.g., email and/or other text message) to the participant, indicating a targeted security alert is available. In various examples, a targeted security alert can be sent to a participant in response to the calculated score being greater than (e.g., beyond) a threshold score.

Figure 3:
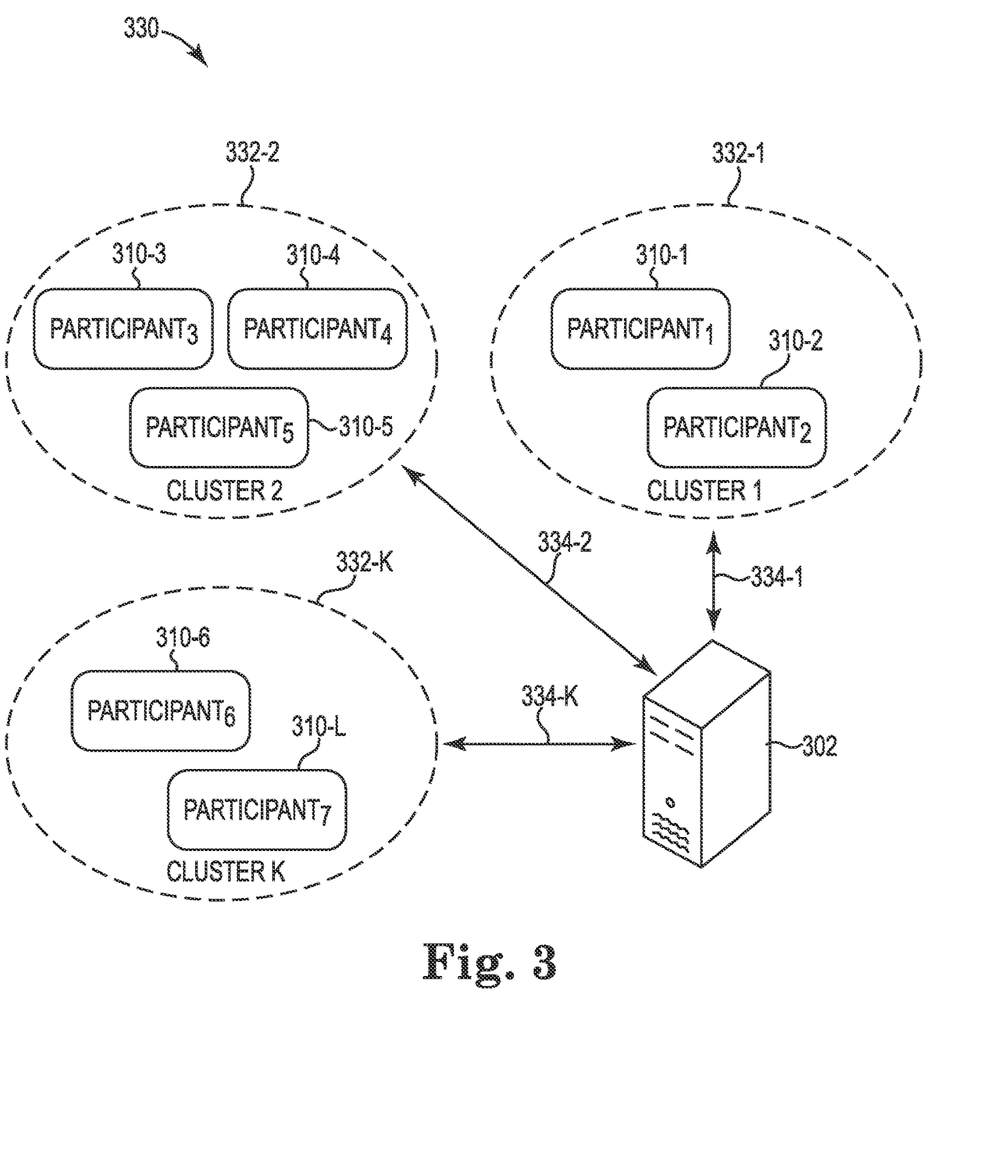
FIG. 3 illustrates a flow chart of an example of grouping participants within a threat exchange community into clusters for providing a targeted security alert according to the present disclose

FIG. 3 illustrates a block diagram of an example of grouping participants 310-1, 310-2, 310-3, 310-4, 310-5, 310-6, . . . , 310-L within a threat exchange community 330 into clusters 332-1, 332-2, . . . , 332-K according to the present disclosure. Grouping participants 310-1, . . . , 310-L into clusters 332-1, . . . , 332-K can be used to calculate threat relevancy scores for participants within the threat exchange community 330.

The clusters 332-1, . . . , 332-K, as illustrated in the example of FIG. 3, can be formed using a threat exchange server 302. The threat exchange server 302 as illustrated in FIG. 3, in various examples, can include the threat exchange server 102 as illustrated in FIG. 1. The arrows 334-1, 334-2, . . . , 334-K, as illustrated in the example of FIG. 3, can include communication links within the threat exchange community 330.

A cluster 332-1, . . . , 332-K of participants 310-1, . . . , 310-L, as used herein, can include a sub-group of participants among the plurality of participants 310-1, . . . , 310-L in the threat exchange community 330. Participants 310-1, . . . , 310-L in the threat exchange community 330 may experience different security occurrences based upon different participant characteristics. For example, participants in a financial industry may see similar security occurrences as other participants in a financial industry. As another example, participants with common IT infrastructure may experience similar security occurrences.

Participants 310-1, . . . , 310-L can be grouped into clusters 332-1, . . . , 332-K, in various examples, based on characteristic data and/or security data provided. For instance, the security data can be continuously collected from the plurality of participants 310-1, . . . , 310-L within the threat exchange community 330 using the threat exchange server 302. As an example, security data can include IP addresses, host names, computer-readable instructions (e.g., program) identifiers, and patch levels, among other data.

The clusters 332-1, . . . 332-K can be formed using a variety of clustering techniques. For instance, the clusters can be formed using a cluster function (e.g., an algorithm). The particular cluster function used can be chosen based upon the details of the characteristic data and/or security data provided. For example, if the characteristic data and/or security data includes numerical values then a cluster function used can include a distance function. If the characteristic data and/or security data includes categorical than other cluster functions may be used. Cluster functions can be hierarchical or non-hierarchical. An example cluster function can include a k-means cluster function that partitions n observations into k clusters in which each observation belongs to the cluster with the nearest mean.

The clusters 332-1, . . . , 332-K can be formed based on characteristic data, security data, and/or a combination thereof. Using the characteristic data, security data, and/or both, the plurality of participants 310-1, . . . , 310-L can be grouped based on behaviors identified (e.g., common behaviors). For instance, the clusters 332-1, . . . , 332-K can be formed based on common security occurrence patterns identified from security data collected over a period of time and/or from the security data provided by the participants 310-1, . . . , 310-L. A common security occurrence pattern can include common security events and/or security incidents between participants (e.g., between, a first participant 310-1 and a second participant 310-2). Common security occurrence patterns can be identified based on correlated IP addresses, common security attacks, common security events and/or security incidents, for instance. Thereby, common security occurrence patterns, in some examples, can be based on security data and characteristic data.

For example, attackers may use correlated IP addresses in security attacks. Correlated IP address can include IP addresses used by an attacker in multiple security attacks. As such, similar IP addresses may be used for similar attacks. Participants can be formed into clusters based upon identification of correlated IP addresses associated with security occurrences.

Alternatively and/or in addition, attackers may attack participants 310-1, . . . , 310-L in common security occurrence patterns due to attack tools that are effective on similar participants and/or because of an objective of the attackers. Attack tools may be effective on particular infrastructure and, thereby, participants 310-1, . . . , 310-L with similar infrastructure may be similarly attacked. The security occurrence patterns between participants 310-1, . . . , 310-L can be identified, for instance, based on similar targeted security alerts provided to participants 310-1, . . . , 310-L. In some instances, an attacker may have an objective and/or view point. For example, participants in similar industries (e.g., banking) may exhibit common security occurrence patterns.

The clusters 332-1, . . . , 332-K can be dynamically grouped, for instance, based on the continuously collected data. Dynamically grouping the plurality of participants 310-1, . . . , 310-L into a plurality of clusters 332-1, . . . , 332-K can include re-evaluating security data and/or characteristic data over time. Dynamically grouping the participants 310-1, . . . , 310 into clusters 332-1, . . . , 332-K can provide participants with a better response to changing technologies and strategies of attackers as compared to a static grouping. For instance, a cluster may identify that an attacker has developed a way to effectively attack a particular hardware component. Providing this information to the participants 310-1, . . . , 310-L may assist the participants 310-1, . . . , 310-L in better securing their network.

In various examples, participants 310-1, . . . , 310-L may provide security data and no and/or limited characteristic data. The grouping of the participants 310-1, . . . , 310-L into a plurality of clusters 332-1, . . . , 332-K can be based on the security data and a sub-portion of characteristic data can be inferred using the security data. Thereby, the clusters 332-1, . . . , 332-K can be formed, in various examples, with a participant providing a sub-portion of relevant characteristic data.

For instance, a cluster (e.g., particular cluster 332-2) can be formed based on security data provided by the participants. The cluster 332-2 may identify a common security occurrence pattern between participants (e.g., particular participants 310-3, 310-4, and 310-5) in the cluster 332-2. The threat exchange server 302 may not have and/or may not know a sub-portion of characteristic data for each participant in the cluster. The threat exchange server 302 may infer this characteristic data not provided by a participant and may use the inferred data to re-form clusters at a future time.

As an example, participant 3 (e.g., 310-3), participant 4 (e.g., 310-4), and participant 5 (e.g., 310-5) may be in a cluster 332-2 (e.g., cluster 2). The threat exchange server 302 may have characteristic data for participant 3 and participant 4 identifying they are using a particular application (e.g., software). The threat exchange server 302 may infer that participant 5 is using the particular application based on the clustering. The inferred information can, for instance, be saved (e.g., in the participant database). Although the present example illustrates inferred information as the identification of an application, inferred information according to the present disclosure is not so limited. For example, inferred information can include various characteristic data.

The clusters 332-1, . . . , 332-K can be used to provide targeted security alerts to participants within the threat exchange community 330. For instance, a threat relevancy score of a particular participant can be calculated by determining a similarity between the participant and a cluster among the plurality of clusters 332-1, . . . , 332-K. The cluster can be, in some instances, a cluster that has a verified security occurrence (e.g., a security attack) against a participant (or more) in the cluster.

As an example, assume participant 3 (e.g., 310-3) and participant 4 (e.g., 310-4) in cluster 2 (e.g., 332-2) have a verified security attack by a particular exploit against a particular vulnerability. Participant 5 (e.g., 310-5) in the cluster 2 may have a higher threat relevancy score calculated based on the verified security attack against the cluster (e.g., cluster 2) than if participant 5 did not belong to the cluster.

In addition, the remaining participants (e.g., 310-1, 310-2, 310-6, 310-L) that belong to different clusters (e.g., 332-1 and 332-K) can have a threat relevancy score calculated by comparing a similarity of each participant to the cluster (e.g., cluster 2). Because the plurality of clusters (332-1, 332-2, . . . , 332-K) are formed based on security data and/or characteristic data, each cluster can be considered a profile that identifies common IT infrastructure, size, industry, security occurrences, and/or other security data and/or characteristic data of the participants within the cluster. A threat relevancy score for participant 6 (e.g., 310-6) in a different cluster (e.g., cluster 3 332-K) can be calculated by comparing participant data (e.g., security data and/or characteristic data) from participant 6 to the profile of cluster 2 (e.g., 332-2). In response to determining participant 6 is similar to the profile of cluster 2, a higher threat relevancy score may be calculated as compared to participant 1 (e.g., 310-1 in cluster 1) which may not be similar to the profile of cluster 2.

Clustering, in various examples of the present disclosure, can be used and/or communicated to participants 310-1, . . . , 310-L for developing security strategies. Clusters 332-1, . . . , 332-K can be used to identify homogenous groups of participants 310-1, . . . , 310-L. Such information can be useful to develop a mitigation strategy that participants 310-1, . . . , 310-L in the homogenous group may benefit from. For instance, a set of participants (e.g., test groups) can be identified using the clusters 332-1, . . . , 332-K to test new mitigation strategies. The clusters 332-1, . . . , 332-K can allow generalization of the results of mitigation testing obtained from one test group to another, reducing the number of test groups required. Further, a participant can use the cluster information to compare themselves against peers (e.g., those in the same industry, same size, etc.) For example, if a participant in a financial industry discovers that they are not in a cluster with industry peers, they may want to understand the contributing causes to why they were clustered differently and if corrective action is needed.

Figure 4:
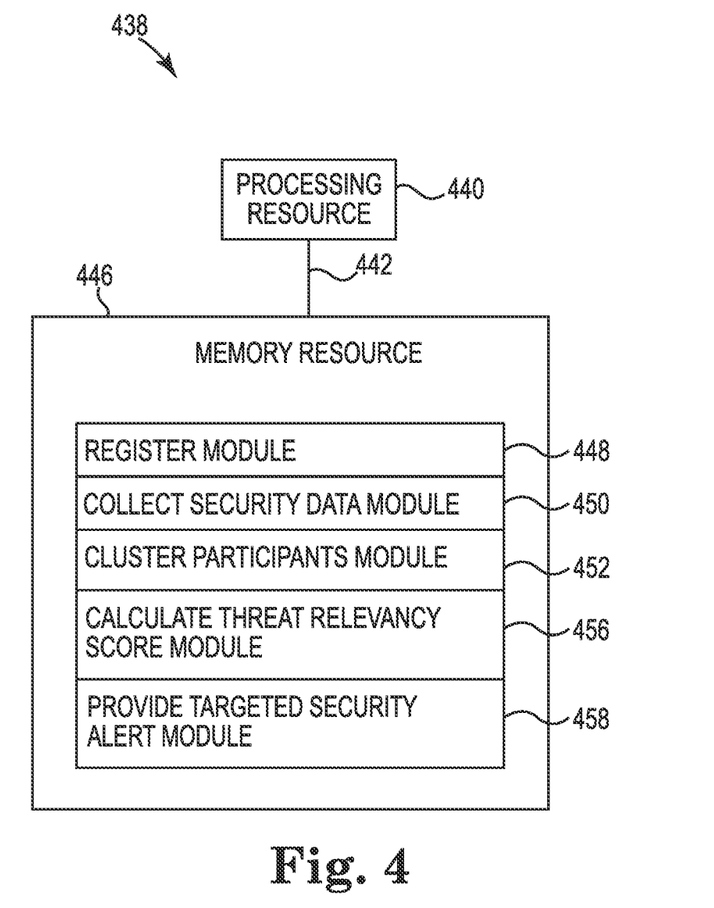
FIG. 4 illustrates a block diagram of an example of a system according to the present disclosure.

FIG. 4 illustrates a block diagram of an example of a system 438 according to the present disclosure. The system 438 can utilize software, hardware, firmware, and/or logic to perform a number of functions.

The system 438 can be any combination of hardware and program instructions configured to provide targeted security alerts. The hardware, for example can include a processing resource 440, a memory resource 446, and/or computer-readable medium (CRM) (e.g., machine readable medium (MRM), database, etc.) A processing resource 440, as used herein, can include any number of processors capable of executing instructions stored by a memory resource 446. Processing resource 440 may be integrated in a single device or distributed across devices. The program instructions (e.g., computer-readable instructions (CRI)) can include instructions stored on the memory resource 446 and executable by the processing resource 440 to implement a desired function (e.g., continuously collect security data from a plurality of participants within a threat exchange community, etc.).

The memory resource 446 can be in communication with a processing resource 440. A memory resource 446, as used herein, can include any number of memory components capable of storing instructions that can be executed by processing resource 440. Such memory resource 446 is non-transitory CRM. Memory resource 446 may be integrated in a single device or distributed across devices. Further, memory resource 446 may be fully or partially integrated in the same device as processing resource 440 or it may be separate but accessible to that device and processing resource 440. Thus, it is noted that the system 438 may be implemented on a user and/or a client device, on a server device and/or a collection of server devices, and/or on a combination of the user device and the server device and/or devices.

The processing resource 440 can be in communication with a memory resource 446 storing a set of CRI executable by the processing resource 440, as described herein. The CRI can also be stored in remote memory managed by a server and represent an installation package that can be downloaded, installed, and executed. The system 438 can include memory resource 446, and the processing resource 440 can be coupled to the memory resource 446.

Processing resource 440 can execute CRI that can be stored on an internal or external memory resource 446. The processing resource 440 can execute CRI to perform various functions, including the functions described with respect to FIG. 1, FIG. 2, and FIG. 3. For example, the processing resource 440 can execute CRI to provide targeted security alerts to participants within a threat exchange community.

The CRI can include a number of modules 448, 450, 452, 456, 458. The number of modules 448, 450, 452, 456, 458 can include CRI that when executed by the processing resource 440 can perform a number of functions.

The number of modules 448, 450, 452, 456, 458 can be sub-modules of other modules. For example, the calculate threat relevancy score module 456 and the provide targeted security alert module 458 can be sub-modules and/or contained within the same computing device. In another example, the number of modules 448, 450, 452, 456, 458 can comprise individual modules at separate and distinct locations (e.g., CRM, etc.).

A register module 448 can include CRI that when executed by the processing resource 440 can provide a number of registration functions. The register module 448 can register a plurality of participants within a threat exchange community, including collecting characteristic data from the plurality of participants. For instance, the register module 448 can use a threat exchange server to collect and store the characteristic data via communication links within the threat exchange community (e.g., communication links from the participants to the threat exchange server). The characteristic data can be stored, for instance, in a participant database located on and/or accessible by the threat exchange server.

A collect security data module 450 can include CRI that when executed by the processing resource 440 can provide a number of security data collection functions. The collect security data module 450 can continuously collect security data from the plurality of participants. For instance, the collect security data module 450 can use a threat exchange server to collect and store the security data via communication links within the threat exchange community (e.g., communication links from the participants to the threat exchange server). The collected security data can be stored, for instance, in an incident database located on and/or accessible by the threat exchange server.

A cluster participants module 452 can include CRI that when executed by the processing resource 440 can perform a number of clustering functions. The cluster participants module 452 can dynamically group the plurality of participants into a plurality of clusters based on behaviors identified from the characteristic data and security data. For instance, the cluster participants module 452 can include instructions to cluster the participants based on common security occurrence patterns identified using the continuously collect security data. In some examples, the cluster participants module 452 can include instructions to dynamically group the participants into clusters based on characteristic data inferred using the continuously collected security data.

A calculate threat relevancy score module 456 can include CRI that when executed by the processing resource 440 can perform a number of threat relevancy score functions. The calculate threat relevancy score module 456 can calculate a threat relevancy score to a participant among the plurality of participants using security data collected from the participant and a cluster among the plurality of clusters. For instance, the calculate threat relevancy score module 456 can use a threat exchange server within the threat exchange community to calculate a threat relevancy score.

A provide targeted security alert module 458 can include CRI that when executed by the processing resource 440 can perform a number of targeted security alert functions. The provide targeted security alert module 458 can provide, from the threat exchange server to the participant, a targeted security alert based on the calculated score via a communication link within the threat exchange community. The targeted security alert can be provided, for instance, in response to the calculated threat relevancy score being above a threshold score.

A memory resource 446, as used herein, can include volatile and/or non-volatile memory. Volatile memory can include memory that depends upon power to store information, such as various types of dynamic random access memory (DRAM), among others. Non-volatile memory can include memory that does not depend upon power to store information.

The memory resource 446 can be integral, or communicatively coupled, to a computing device, in a wired and/or a wireless manner. For example, the memory resource 446 can be an internal memory, a portable memory, a portable disk, or a memory associated with another computing resource (e.g., enabling CRIs to be transferred and/or executed across a network such as the Internet).

The memory resource 446 can be in communication with the processing resource 440 via a communication path 442 (e.g., a communication link). The communication path 442 can be local or remote to a machine (e.g., a computing device) associated with the processing resource 440. Examples of a local communication path 442 can include an electronic bus internal to a machine (e.g., a computing device) where the memory resource 446 is one of volatile, non-volatile, fixed, and/or removable storage medium in communication with the processing resource 440 via the electronic bus.

The communication path 442 can be such that the memory resource 446 is remote from the processing resource (e.g., 440), such as in a network connection between the memory resource 446 and the processing resource (e.g., 440). That is, the communication path 442 can be a network connection. Examples of such a network connection can include a local area network (LAN), wide area network (WAN), personal area network (PAN), and the Internet, among others. In such examples, the memory resource 446 can be associated with a first computing device and the processing resource 440 can be associated with a second computing device (e.g., a Java® server). For example, a processing resource 440 can be in communication with a memory resource 446, wherein the memory resource 446 includes a set of instructions and wherein the processing resource 440 is designed to carry out the set of instructions.

The processing resource 440 coupled to the memory resource 446 can execute CRI to register a plurality of participants within a threat exchange community, including collecting characteristic data from the plurality of participants. The processing resource 440 coupled to the memory resource 446 can execute CRI to continuously collect security data from the plurality of participants. The processing resource 440 coupled to the memory resource 446 can also execute CRI to dynamically group the plurality of participants into a plurality of clusters based on behaviors identified from the characteristic data and security data. The processing resource 440 coupled to the memory resource 446 can also execute CRI to calculate, using a threat exchange server, a threat relevancy score to a participant among the plurality of participants using security data collected from the participant and a cluster among the plurality of clusters. Further, the processing resource 440 coupled to the memory resources 446 can also execute CRI to provide a targeted security alert from the security exchange server to the participant based on the calculated threat relevancy score via a communication link within the threat exchange community.

As used herein, "logic" is an alternative or additional processing resource to execute the actions and/or functions, etc., described herein, which includes hardware (e.g., various forms of transistor logic, application specific integrated circuits (ASICs), etc.), as opposed to computer executable instructions (e.g., software, firmware, etc.) stored in memory and executable by a processor.

The specification examples provide a description of the applications and use of the system and method of the present disclosure. Since many examples can be made without departing from the spirit and scope of the system and method of the present disclosure, this specification sets forth some of the many possible example configurations and implementations.

What is claimed:
1. A method for providing a targeted security alert, the method comprising:
    collecting participant data from a plurality of participants within a threat exchange community, the collected participant data including characteristics of attackers in security attacks against the plurality of participants;
    grouping the plurality of participants into a plurality of clusters based on the characteristics of the attackers in the security attacks against the plurality of participants;
    calculating, using a threat exchange server, a threat relevancy score of a participant among the plurality of participants using the collected participant data and a cluster among the plurality of clusters; and
    providing, from the threat exchange server to the participant, a targeted security alert based on the calculated threat relevancy score via a communication link within the threat exchange community.
2. The method of claim 1, wherein calculating the threat relevancy score includes statistically modeling a probability that a security occurrence is relevant to the participant based on a subset of the collected participant data.
3. The method of claim 1, wherein calculating the threat relevancy score includes statistically modeling a probability that the participant will be attacked by an exploit against a vulnerability.
4. The method of claim 1, wherein the characteristics of the attackers include an internet protocol (IP) address used by an attacker in multiple security attacks.
5. The method of claim 1, wherein the characteristics of the attackers include an attack tool used by an attacker in multiple security attacks.
6. A non-transitory computer-readable medium storing a set of instructions executable by a processing resource, wherein the set of instructions can be executed by the processing resource to:
    collect characteristic data and security data from a plurality of participants within a threat exchange community, the collected security data including characteristics of attackers in security attacks against the plurality of participants;
    group the plurality of participants into a plurality of clusters based on the characteristics of the attackers in the security attacks against the plurality of participants included in the collected security data;
    calculate, using a threat exchange server, a threat relevancy score of a participant among the plurality of participants using security data from the participant and a cluster among the plurality of clusters; and provide, from the threat exchange server to the participant, a targeted security alert based on the calculated threat relevancy score via a communication link within the threat exchange community.

7. The medium of claim 6, wherein the characteristics of the attackers include an internet protocol (IP) address used by an attacker in multiple security attacks.

8. The medium of claim 6, wherein the instructions executable by the processing resource to provide the targeted security alert include instructions to send the targeted security alert to the participant in response to the threat relevancy score being beyond a threshold score.

9. The medium of claim 6, wherein the instructions executable by the processing resource to calculate the threat relevancy score of the participant include instructions to consider security context to identify a threat level.

10. The medium of claim 6, wherein the instructions executable by the processing resource to provide the targeted security alert include instructions to provide supporting evidence in the targeted security alert.

11. The medium of claim 6, wherein the instructions executable by the processing resource to calculate the threat relevancy score of the participant include instructions to determine a similarity of the participant to the cluster.

12. The medium of claim 6, wherein the characteristics of the attackers include an attack tool used by an attacker in multiple security attacks.

13. The medium of claim 6, wherein the characteristics of the attackers include an objective of an attacker in multiple security attacks.

14. The method of claim 1, wherein the characteristics of the attackers include an objective of an attacker in multiple security attacks.

* * * * *